Dec. 15, 1964     E. R. DUNN     3,160,996
WORK FEEDING DEVICE
Filed April 17, 1962
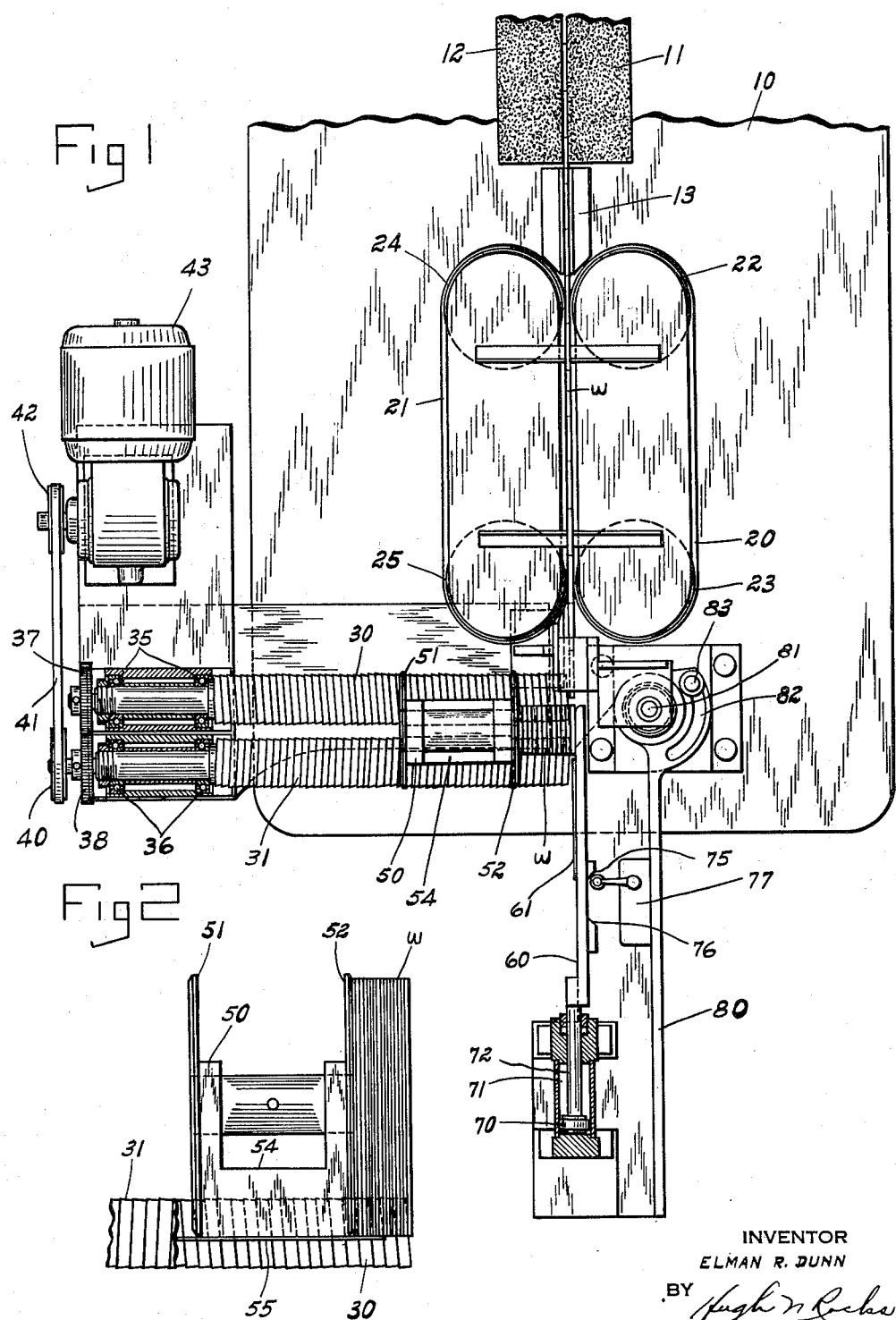
INVENTOR
ELMAN R. DUNN
BY *Hugh N Rocks*
ATTORNEY 3,160,996
WORK FEEDING DEVICE
Elman R. Dunn, Beloit, Wis., assignor, by mesne assignments, to Landis Tool Company, Waynesboro, Pa., a corporation of Pennsylvania
Filed Apr. 17, 1962, Ser. No. 188,215
1 Claim. (Cl. 51—215)

The invention relates to work feeding devices for machine tools which process workpieces by what is generally termed through feeding.

This method is used particularly on disc-type surface grinders and centerless grinders. For the purpose of illustration, the invention is disclosed in connection with a double disc surface grinder.

A review of previous roller-type feeders shows that the feeding action was provided either by the use of tapered rollers, skewed cylindrical rollers, or skewed tapered rollers.

It is, therefore, an object of the present invention to provide a roller-type feeding mechanism which does not depend for its feeding action on a non-cylindrical shape or an angular relation between the axes of the rollers.

Another object is to provide cylindrical feeding rollers which depend for the feeding action only on the relative rotation of the parallel cylindrical rollers each having a helical groove.

Another object is to provide means resting on said rollers and movable axially by rotation of said rollers for holding workpieces in upright position.

FIG. 1 is a partial plan view of a disc grinder showing the work handling mechanism.

FIG. 2 is a partial sectional elevation of the pusher member and the feed roller.

The work handling mechanism is mounted on bed 10 of a double disc grinder on which a pair of annularly opposed abrasive discs 11 and 12 are rotatably mounted.

Workpieces W, such as piston rings, are directed between discs 11 and 12 by guide member 13. The means for advancing workpieces W consists of a pair of opposed belts 20 and 21, each arranged to ride suitable pulleys. Belt 20 rides on pulleys 22 and 23 and belt 21 rides on pulleys 24 and 25.

The means for conducting workpieces W to a position to be introduced by belts 20 and 21 consists of a pair of parallel rollers 30 and 31. Roller 30 has a shallow right hand helical groove or thread formed thereon and roller 31 has a shallow left hand helical groove or thread formed thereon. These helical grooves or threads are a modified form of a buttress thread with the maximum diameter of the thread at the trailing end. With this arrangement, a substantial frictional, rather than positive, force may be applied to move pusher 50 and workpiece W along rollers 30 and 31. Said rollers are suitably mounted in bearings 35 and 36. Gear 37 on the end of roller 30 meshes with gear 38 on the end of roller 31. Pulley 40 adjacent gear 38 is connected through belt 41 to pulley 42 on motor 43 which is preferably an adjustable speed motor so that speed may be changed when necessary, to supply workpieces at a rate in faster than the work can be fed to the machine. Motor 43 may also be connected through a separate belt to each of rollers 30 and 31. Said rollers may be mounted for lateral adjustment toward and from each other as described in U.S. Patent 2,565,016, granted November 13, 1947.

Pusher 50 adapted for movement axially on said rollers solely by frictional contact with rollers 30 and 31, serves to hold workpieces W in upright position as they move along said rollers. Bottom plate 55 attached to weight 54 extends beyond discs 51 and 52 in the direction of travel of workpiece W so that a substantial number of workpieces may be supported on plate 55 and thus add to the stabilizing effect of weight 54. It is true that the extended portion of plate 55 will interfere with the automatic feeding of the workpieces which it supports. However, these need not be ground until the end of the run of that particular size of the workpiece, at which time, they may be advanced manually to the point of pick-up by work engaging portion 61.

The means for transferring workpieces W from rollers 30 and 31 to belts 20 and 21 consists of a reciprocating member 60 which, in one position, serves as a stop to limit the advance of workpieces W on said rollers.

Work engaging portion 61 on reciprocating member 60 is substantially the same thickness as a workpiece and is positioned on member 60 adjacent the portion against which workpieces W are fed.

The means for actuating reciprocating member 60 consists of piston 70 in cylinder 71 and having a piston rod 72 attached to member 60. The range and zone of movement of member 60 is determined by the positions of cams 75 and 76 on member 60. Cams 75 and 76 actuate switch 77 which is connected to a suitable valve for directing fluid under pressure alternately to opposite ends of cylinder 71.

The above mentioned elements are supported on bracket 80 pivotally supported at 81 on bed 10. Angular adjustment is provided by the arcuate slot 82 in bracket 80 and clamping screw 83.

The rate of advance of workpieces W on rollers 30 and 31 is determined by the lead of the helical grooves or the speed of rotation of said rollers, or both. The feed rate of the work into the machine is determined by the rate at which member 60 supplies workpieces W to belts 20 and 21. Both of these rates vary independently. However, it is desirable that the feeding rate of rollers 30 and 31 be such as to maintain a slight pressure of workpieces W against reciprocating member 60.

I claim:

A work feeding device for feeding stacks of disc-like or ring-like workpieces in a machine tool comprising a pair of rotatably mounted parallel rollers, helical threads on said rollers for advancing workpieces axially by frictional rather than positive engagement with said workpieces in response to rotation of said rollers, means for rotating said rollers, and a pusher resting freely on and movable by frictional engagement in response to rotation of said rollers and adapted to bear against the last of a plurality of workpieces to hold said workpieces together.

References Cited in the file of this patent
UNITED STATES PATENTS

| | | |
|---|---|---|
| 472,507 | Moran | Apr. 5, 1892 |
| 487,409 | Moran | Dec. 6, 1892 |
| 1,636,014 | Robinson | July 19, 1927 |
| 1,658,092 | Miller | Feb. 7, 1928 |
| 1,767,775 | Slick | June 24, 1930 |
| 1,906,731 | Wuerfel | May 2, 1933 |
| 1,971,574 | Moon | Aug. 28, 1934 |
| 2,055,108 | Hokonson | Sept. 22, 1936 |
| 2,584,587 | Huyett | Feb. 5, 1952 |
| 2,608,815 | Graff | Sept. 2, 1952 |
| 2,612,733 | Twombley | Oct. 7, 1952 |
| 3,029,922 | Rau | Apr. 17, 1962 |